(12) United States Patent
Stoicescu et al.

(10) Patent No.: US 12,124,655 B2
(45) Date of Patent: Oct. 22, 2024

(54) ULTRASONIC TOUCH SENSORS AND CAPACITIVE PRESSURE SENSING MICROELECTROMECHANICAL SYSTEM FUSION

(71) Applicant: Infineon Technologies AG, Neubiberg (DE)

(72) Inventors: Emanuel Stoicescu, Bucharest (RO); Matthias Eberl, Taufkirchen (DE); Costin Batrinu, Bucharest (RO); Klaus Elian, Alteglofsheim (DE)

(73) Assignee: Infineon Technologies AG, Neubiberg (DE)

( * ) Notice: Subject to any disclaimer, the term of this patent is extended or adjusted under 35 U.S.C. 154(b) by 44 days.

(21) Appl. No.: 18/159,817

(22) Filed: Jan. 26, 2023

(65) Prior Publication Data
US 2024/0094850 A1    Mar. 21, 2024

Related U.S. Application Data

(60) Provisional application No. 63/376,126, filed on Sep. 19, 2022.

(51) Int. Cl.
*G06F 3/041* (2006.01)
*G06F 3/043* (2006.01)
*G06F 3/044* (2006.01)

(52) U.S. Cl.
CPC .......... *G06F 3/04186* (2019.05); *G06F 3/043* (2013.01); *G06F 3/044* (2013.01); *G06F 2203/04105* (2013.01)

(58) Field of Classification Search
CPC ............................... G06F 3/041–047
See application file for complete search history.

(56) References Cited

U.S. PATENT DOCUMENTS

| | | | |
|---|---|---|---|
| 11,520,439 B1 * | 12/2022 | Ciotirca | G01S 15/003 |
| 11,698,701 B1 * | 7/2023 | Stoicescu | G06F 3/0436 |
| | | | 345/177 |
| 11,768,562 B1 * | 9/2023 | Plaiseanu | G06F 3/0418 |
| | | | 345/177 |
| 11,860,272 B2 * | 1/2024 | Elian | G01S 7/521 |
| 11,886,668 B1 * | 1/2024 | Eberl | G06F 3/0436 |
| 11,934,617 B1 * | 3/2024 | Stoicescu | G06F 3/0418 |

(Continued)

*Primary Examiner* — Rodney Amadiz
(74) *Attorney, Agent, or Firm* — Harrity & Harrity, LLP

(57) ABSTRACT

A touch sensor includes a touch structure including a touch interface and an inner interface arranged opposite to the touch interface; a capacitive ultrasonic transmitter arranged inside an enclosed interior volume and configured to transmit an ultrasonic transmit wave towards the touch structure; a capacitive ultrasonic receiver arranged inside the enclosed interior volume and configured to receive at least one ultrasonic reflected wave produced from the ultrasonic transmit wave via internal reflection; a coupling medium that fills an area between the inner interface and the capacitive ultrasonic receiver, wherein an external force applied to the touch interface is configured to impart an internal pressure onto the capacitive ultrasonic receiver through the coupling medium; and a sensor circuit configured to convert the at least one ultrasonic reflected wave into a measurement signal and detect the external force based on the measurement signal.

24 Claims, 5 Drawing Sheets

(56) References Cited

U.S. PATENT DOCUMENTS

| | | | |
|---|---|---|---|
| 2009/0235750 A1* | 9/2009 | Chang | G06F 3/043 |
| | | | 73/627 |
| 2016/0018948 A1* | 1/2016 | Parvarandeh | G06F 1/163 |
| | | | 345/175 |
| 2018/0101711 A1* | 4/2018 | D'Souza | G06V 40/1306 |
| 2018/0341359 A1* | 11/2018 | Khajeh | G06F 3/0436 |
| 2020/0160018 A1* | 5/2020 | Panchawagh | H10N 30/857 |
| 2024/0086017 A1* | 3/2024 | Elian | B06B 1/0292 |

* cited by examiner

ULTRASONIC TOUCH SENSORS AND CAPACITIVE PRESSURE SENSING MICROELECTROMECHANICAL SYSTEM FUSION

CROSS REFERENCE TO RELATED APPLICATION

This patent application claims priority to U.S. Provisional Patent Application No. 63/376,126, filed on Sep. 19, 2022, and entitled "ULTRASONIC TOUCH SENSORS AND CAPACITIVE PRESSURE SENSING MICROELECTROMECHANICAL SYSTEM FUSION." The disclosure of the prior application is considered part of and is incorporated by reference into this patent application.

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event that can be used to discriminate between the existence or the non-existence of the touch event.

SUMMARY

One or more implementations provide a touch sensor, including: a frame that defines an ultrasound chamber; a touch structure coupled to the frame and arranged over the ultrasound chamber such that the ultrasound chamber forms an enclosed interior volume, wherein the touch structure includes a touch interface and an inner interface arranged opposite to the touch interface, wherein the inner interface faces towards the enclosed interior volume; a capacitive ultrasonic transmitter arranged inside the enclosed interior volume, wherein the capacitive ultrasonic transmitter is configured to transmit an ultrasonic transmit wave towards the touch structure; a capacitive ultrasonic receiver arranged inside the enclosed interior volume and coupled to the capacitive ultrasonic transmitter via a propagation path, wherein the capacitive ultrasonic receiver is configured to receive a first ultrasonic reflected wave produced from the ultrasonic transmit wave being internally reflected at the inner interface and receive a second ultrasonic reflected wave produced from the ultrasonic transmit wave being internally reflected at the touch interface; a coupling medium that fills an area between the inner interface and the capacitive ultrasonic receiver to form part of the propagation path, wherein the inner interface and the capacitive ultrasonic receiver are mechanically coupled to each other by the coupling medium, wherein an external force applied to the touch interface is configured to impart an internal pressure onto the capacitive ultrasonic receiver through the coupling medium, wherein the internal pressure is proportional to the external force; and a sensor circuit configured to convert the first ultrasonic reflected wave received by the capacitive ultrasonic receiver into a first measurement signal, convert the second ultrasonic reflected wave received by the capacitive ultrasonic receiver into a second measurement signal, and detect the external force based on at least one of the first measurement signal and the second measurement signal.

BRIEF DESCRIPTION OF THE DRAWINGS

Implementations are described herein making reference to the appended drawings.

DETAILED DESCRIPTION

Figure 1A:
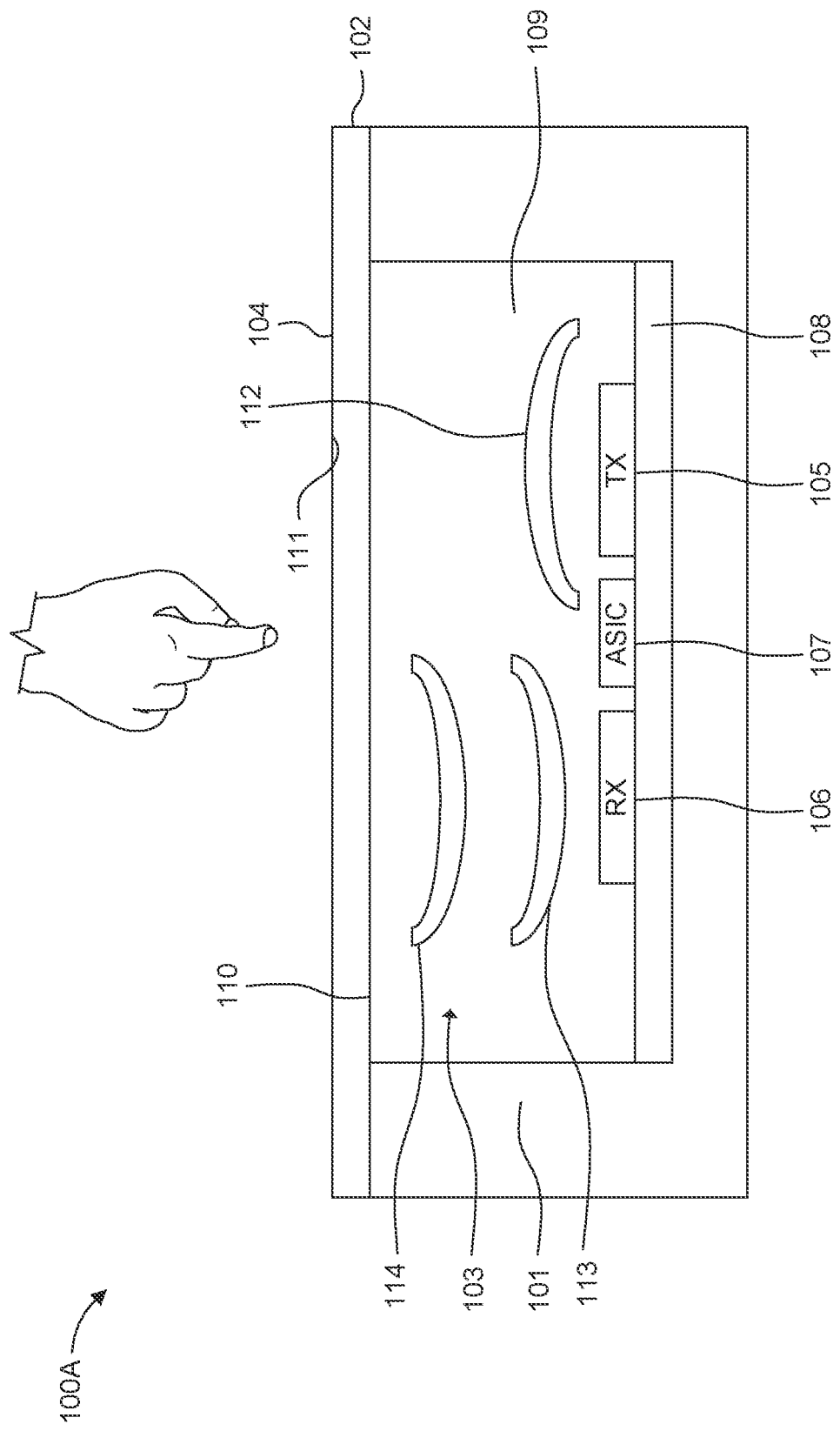
FIG. 1A illustrates an ultrasonic touch sensor according to one or more implementations.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A sensor may refer to a component which converts a physical quantity to be measured to an electrical signal, for example, a current signal or a voltage signal. For an ultrasonic touch sensor, the physical quantity is an ultrasound wave produced, for example, by a microelectromechanical system (MEMS) transducer. The ultrasonic touch sensor can be used for sensing touch (e.g., a touch event) through metal surfaces using ultrasound waves. Specifically, the ultrasonic touch sensor can discriminate between an existence of the touch event or a non-existence of the touch event (e.g., a no-touch event). However, an issue arises when a user is wearing a glove, which does not allow energy of a transmitted ultrasound wave to be absorbed adequately for the ultrasonic touch sensor to detect the touch made by the user. Accordingly, the touch made with while wearing the glove may not be detected and may be misinterpreted by the ultrasonic touch sensor as the no-touch event.

Some implementations disclosed herein are directed to a sensor fusion system that uses two sensing principles for touch detection, including an ultrasonic sensing system and a pressure sensing system, for sensing a touch force that occurs during any type of touch event, including a touch event involving a user wearing a glove. By incorporating the pressure sensing system into a touch sensor, the touch sensor can appropriately discriminate between touch events and no-touch events, including touch events that from indirect touch, such as those involving the user wearing a glove. As a result, the touch made with while wearing the glove can be detected and be appropriately identified by the touch sensor as a touch event.

FIG. 1A illustrates an ultrasonic touch sensor 100A according to one or more implementations. The ultrasonic touch sensor 100A includes a housing comprising an encapsulant 101 (e.g., molding) and a touch structure 102 (e.g., a touch substrate) that forms an interior volume 103 with the encapsulant 101 (e.g., overmolded thermoplastic). In other words, as part of the housing, the encapsulant 101 has a recess that becomes the interior volume 103 when the touch structure 102 encloses the recess. In some implementations, the encapsulant 101 may extend into and fill the interior volume 103, thereby covering one or more sensor components arranged therein. Epoxy or some other ultrasound-compatible material casted in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the housing. In the example shown, the interior volume 103 is a chamber that is formed by the enclosure of the encapsulant 101 and the touch structure 102. The touch structure 102 may be made of one or more metal layers, one or more plastic layers, and/or one or more layers made out of another solid material. The touch structure 102 includes a touch surface 104 at its external interface with an environment. The touch surface 104 is arranged and operable to receive contact (i.e., touches) from a user that can be detected by sensor circuitry.

The interior volume 103 contains the sensor circuitry used for detecting the no-touch events and the touch events at the touch surface 104. A touch event is defined as an instance when the user makes contact with the touch surface 104 and a no-touch event is all other circumstances, including the occurrence of disturbing influences (i.e., error sources) that may occur in the absence of the touch event. The sensor circuitry is configured to distinguish between the touch event and the no-touch event, taking into account possible errors originating from the disturbing influences.

As defined herein, an ultrasound wave is a sound wave having a frequency of 20 kHz or higher. An ultrasound wave may be referred to as an ultrasonic transmit wave when the ultrasound wave is transmitted by a transmitter and may be referred to as an ultrasonic reflected wave when the ultrasound wave has been reflected by the touch structure 102 for reception at a receiver. The sensor circuitry includes a transmitter 105 configured to transmit ultrasound waves (e.g., ultrasonic transmit waves), a receiver 106 configured to receive reflected ultrasound waves (e.g., ultrasonic reflected waves), and a sensor circuit 107 (e.g., an application specific integrated circuit (ASIC)) configured to generate the ultrasound waves for transmission by the transmitter 105, perform signal processing on the reflected ultrasound waves received by the receiver 106, evaluate the reflected ultrasound waves for detecting no-touch events and touch events by applying a touch detection algorithm, and control one or more components of the ultrasonic touch sensor 100A, including control of the transmitter 105, the receiver 106, or any signal processing components of a signal processing chain of the sensor circuit 107.

The transmitter 105 and the receiver 106 may both be sound transducers, each with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducer (CMUTs). A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The transmitter 105 and the receiver 106 may also be combined into a single transceiver transducer that has a single flexible membrane.

When an AC signal is applied across biased electrodes of the capacitor, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the membrane to vibrate according to the waveform of the excitation signal and producing a corresponding ultrasound wave. Different excitation signals induce different ultrasound waves.

On the other hand, when an ultrasound wave is applied to the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the encapsulant 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the interior volume 103 may be filled with a coupling medium 109, such as a silicone gel, soft epoxy, liquid, or any other material that enables the propagation of ultrasonic waves with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. In order to provide mechanical coupling between the touch structure 102 and the receiver 106, the coupling medium 109 is a non-gaseous medium.

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 towards the touch structure 102 (e.g., at the first interface 110 and the second interface 111). The first interface 110 and the second interface 111 are configured to reflect the ultrasonic transmit wave 112 back into the interior volume 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113 and the second interface 111 reflects the ultrasonic transmit wave 112 by internal reflection to produce the ultrasonic reflected wave 114. Being that the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received and the sensor circuit 107 may extract a first measurement signal from the continuous measurement signal in a first observation window corresponding to the ultrasonic reflected wave 113 and may extract a second measurement signal from the continuous measurement signal in a second observation window corresponding to the ultrasonic reflected wave 114. Thus, the first measurement signal and the second measurement signal may be different portions of the continuous measurement signal output by the receiver 106.

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 changes when the touch surface 104 is touched by, for example, a finger of the user. The change in the ultrasonic reflected wave 114 can be detected at a receiver side of the ultrasonic touch sensor 100A for detecting the touch event or the no-touch event as well as determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The signal amplitude of the ultrasonic reflected wave 114 during the no-touch event may be used by the sensor circuit 107 as a baseline level or a reference level for a touch, no-touch determination. Therefore, it can be said that a property of the ultrasonic reflected wave 114 will depend on the existence or the non-existence of the touch event. The property of the reflected ultrasonic sound wave is measured at the sensor circuit 107 to discriminate between a presence of the touch event or the no-touch event.

Meanwhile, it can be said that the acoustic impedance change resulting from the touch event is minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104. In particular, during operation of the ultrasonic touch sensor 100A, the sensor circuit 107 is configured to apply a touch detection algorithm to distinguish between the touch event and the no-touch event, taking into account possible error sources, such as electrical and ultrasonic cross-talk, multipath propagation, noise, temperature, and environmental disturbances, such as dirt or water on the touch surface 104. The touch detection algorithm may include a machine learning model that may be trained to distinguish between a touch and no-touch event.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100A, the sensor circuit 107 is configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be in the order of 25 microseconds (μs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis.

An excitation signal may be a short signal pulse or a pulse train comprised of multiple short pulses (e.g., having a duration of about 100 nanoseconds (ns) up to about 1 μs). An excitation signal can have any shape (e.g., rectangular, sinusoid, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples may be used for performing the direct down-conversion. Analog circuit blocks for such a down-conversion processing can be a multiplier or even just a diode. A low-pass filter cut-off frequency should be tuned to the bandwidth of the transmitted ultrasonic signal and the bandwidth of the transmitter 105. For example, the low-pass filter cut-off frequency could be set to 1 MHz or 2 MHz.

The sensor circuit 107 includes an analog-to-digital converter (ADC) that is configured to capture multiple digital samples (e.g., measurement samples) from the ultrasonic reflected waves 113 and 114 for each ultrasonic transmit wave 112 and store the digital samples in memory. A digital processor of the sensor circuit 107 is operable to evaluate the digital samples received in an observation window using the touch detection algorithm to determine whether there is the no-touch event or the touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time it takes for the ultrasonic transmit wave 112 to travel from the transmitter 105, to the first interface 110, and back to the receiver 106. Likewise, a time-of-flight of a second reflection (e.g., the ultrasonic reflected wave 114) is a time it takes for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1A is provided merely as an example. Other examples are possible and may differ from what was described with regard to FIG. 1A. For example, in some implementations, an array or transmitters, receivers, or transceivers may be provided within the interior volume 103 of the ultrasonic touch sensor 100A. In some implementations, the touch structure 102 may include multiple layers resulting in more than two ultrasound reflections or echoes. In some implementations, additional circuit components may be added without deviating from the disclosure provided above.

Figure 1B:
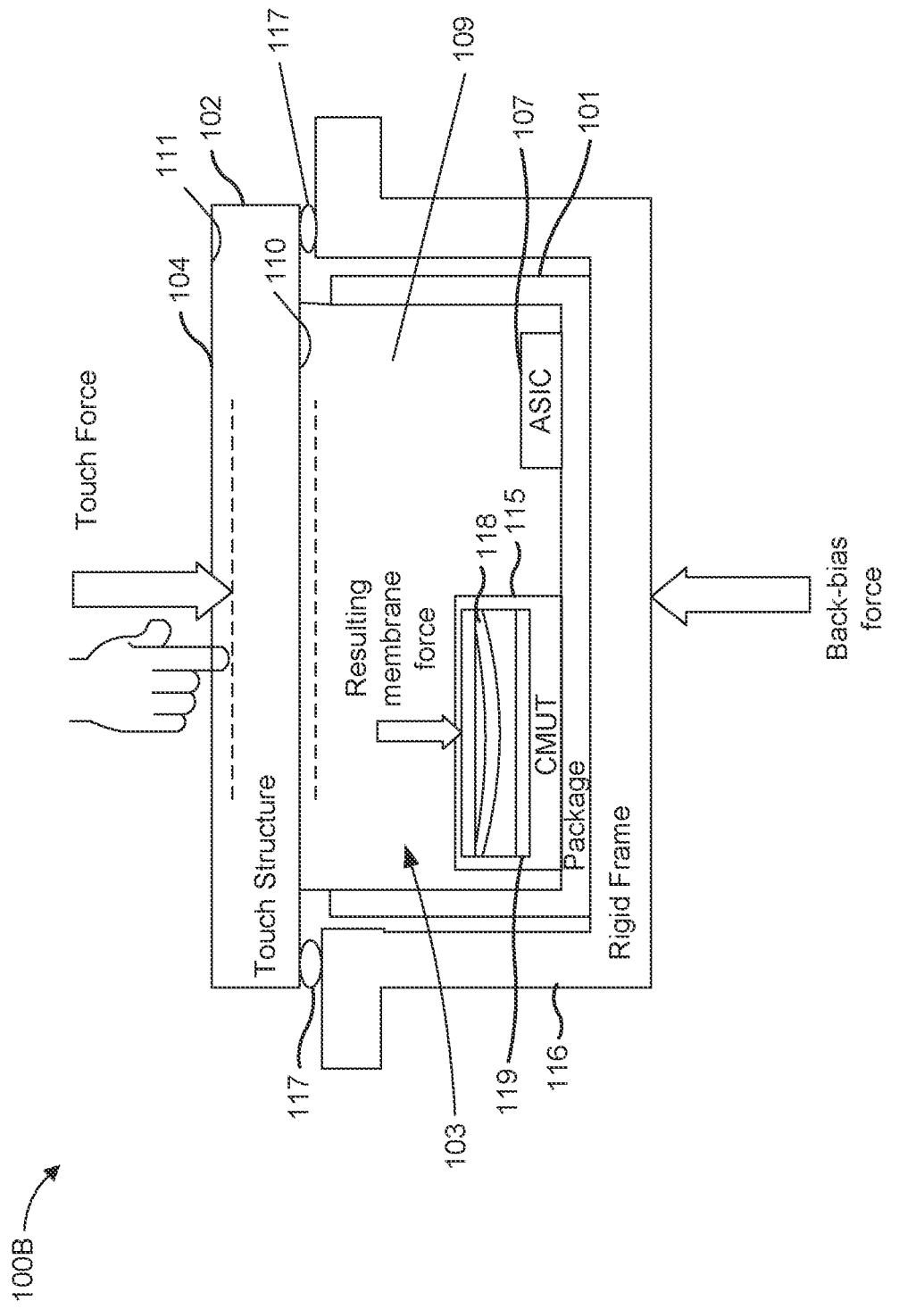
FIG. 1B illustrates an ultrasonic touch sensor according to one or more implementations.

FIG. 1B illustrates an ultrasonic touch sensor 100B according to one or more implementations. In addition to measuring reflected ultrasound waves, such as ultrasonic reflected waves 113 and 114 for touch detection, the ultrasonic touch sensor 100B can be configured to detect pressure changes resultant from a touch event for performing the touch detection. Such a configuration may enable the ultrasonic touch sensor 100B to detect touch events even when the user is wearing a glove.

The ultrasonic touch sensor 100B is similar to the ultrasonic touch sensor 100A, with the exception that the transmitter 105 and the receiver 106 are combined into a transceiver transducer 115 and some aspects of the housing and packaging may differ. However, while some differences between the ultrasonic touch sensor 100A and the ultrasonic touch sensor 100B may exist, it will be appreciated that a pressure sensing system described in conjunction the ultrasonic touch sensor 100B of FIG. 1B can be similarly applied to the ultrasonic touch sensor 100A of FIG. 1A.

The ultrasonic touch sensor 100B may include a rigid frame 116 that provides additional mechanical support. The rigid frame 116 is mechanically coupled to the encapsulant 101 and further mechanically coupled, although indirectly, to the coupling medium 109. As a result, the rigid frame 116 is elastically coupled to the touch structure 102 by the coupling medium 109. A back-bias force may be applied to the rigid frame 116 which keeps the ultrasonic touch sensor 100B fixed even in the presence of a touch force applied to the touch structure 102. For example, the ultrasonic touch sensor 100B may be supported underneath the rigid frame 116 by an immovable support structure that provides the back-bias force.

The ultrasonic touch sensor 100B may include elastic coupling structures 117 that elastically attach the touch structure 102 to the rigid frame 116. The elastic coupling structures 117 are configured to compress when the touch force applied to the touch structure 102 and decompress when the touch force is removed from the touch structure 102. The touch structure 102 is pushed or bent inward by the touch force as a mechanical effect, which causes the touch force to be coupled into the coupling medium 109. In particular, the elastic coupling structures 117 enable the touch structure 102 to compress the coupling medium 109 when the touch force is applied to the touch surface 104. As the elastic coupling structures 117 are compressed, the touch structure 102 is pushed or bent into the coupling medium 109. As a result, the touch force causes internal pressure inside the coupling medium 109 to increase. Because the coupling medium 109 is coupled to (e.g., in contact with) both the touch structure 102 and to a flexible membrane 118 of the transceiver transducer 115, the internal pressure acts as a mechanical force on the flexible membrane 118. In other words, the touch force is translated by the coupling medium 109 into the internal pressure that is applied to the flexible membrane 118. When the touch force is removed, the internal pressure acting on the flexible membrane 118 is also removed due to decompression of the coupling medium 109 and the elastic coupling structures 117. The sensor circuit 107 may be configured to detect a change in the internal pressure acting on the flexible membrane 118 when analyzing the ultrasonic reflected waves 113 and 114.

The analysis performed by the sensor circuit 107 may depend on a hardness of a material used for the coupling medium 109. For example, when the material of the coupling medium 109 is a medium-hard elastic material (e.g., a medium-hard gel), the touch force applied to the touch surface 104 imparts a low added pressure on the flexible membrane 118. In other words, the touch force results in a small, gradual reduction in a MEMS cavity height between the flexible membrane 118 and a counter electrode 119 of the transceiver transducer 115. This reduction in the MEMS cavity height increases an overall sensitivity of the transceiver transducer 115 during reception of ultrasonic reflected waves 113 and 114. An increase in the overall sensitivity of the transceiver transducer 115 means that there is a gradual increase in all ultrasound reflections or echoes measured during the touch event, proportional to the applied touch force. In other words, the signal amplitudes of both of the ultrasonic reflected waves 113 and 114 sensed at the transceiver transducer 115 and measured by the sensor circuit 107 during reception will undergo a similar increase in amplitude due to the increased sensitivity of the transceiver transducer 115.

As a result, the sensor circuit 107 can measure a change (e.g., a signal increase) in the signal amplitude of the ultrasonic reflected wave 113 that is reflected from the first interface 110 as a basis for detecting the touch event as well as an amount of touch force applied. For example, a signal amplitude of the ultrasonic reflected wave 113 during a no-touch event may serve as a baseline level (e.g., a reference level) for touch evaluation. During the observation window used for evaluating the ultrasonic reflected wave 113, if the signal amplitude of the ultrasonic reflected wave 113 increases from the baseline level by more than a threshold amount, the sensor circuit 107 can detect that the touch event has occurred. Moreover, by evaluating an increased amount of change (e.g., a delta value) between a measured signal amplitude of the ultrasonic reflected wave 113 and the baseline level, the sensor circuit 107 can determine the amount of touch force applied to the touch surface 104. This pressure sensing system can be used for detecting any type of touch applied to the touch surface 104, even those involving indirect contact with a finger, such as when a glove is involved.

Similarly, the sensor circuit 107 can measure a change (e.g., a signal increase) in the signal amplitude of the ultrasonic reflected wave 114 that is reflected from the second interface 111 as a basis for detecting the touch event as well as an amount of touch force applied. For example, a signal amplitude of the ultrasonic reflected wave 114 during a no-touch event may serve as a baseline level for touch evaluation. During the observation window used for evaluating the ultrasonic reflected wave 114, if the signal amplitude of the ultrasonic reflected wave 114 increases from the baseline level by more than a threshold amount, the sensor circuit 107 can detect that the touch event has occurred. Moreover, by evaluating an increased amount of change (e.g., a delta value) between a measured signal amplitude of the ultrasonic reflected wave 114 and the baseline level, the sensor circuit 107 can determine the amount of touch force applied to the touch surface 104. This pressure sensing system can be used for detecting any type of touch applied to the touch surface 104, even those involving indirect contact with a finger, such as when a glove is involved.

Similarly, the sensor circuit 107 can measure a change (e.g., a signal increase) in the signal amplitude of all ultrasound reflections, including the ultrasonic reflected waves 113 and 114, relative to a respective baseline level for each ultrasound reflection. If the sensor circuit 107 determines that all of the ultrasound reflections undergo a signal increase relative to the respective baseline level, the sensor circuit 107 can determine that the touch event has occurred. The signal increases of the measured ultrasound reflections may be the same or may be proportional to each other.

The sensor circuit 107 can detect instances when the signal amplitude of the ultrasonic reflected wave 114 decreases from the baseline level by more than a threshold amount for detecting touch events that cause the acoustic impedance of the touch surface 104 to change. For example, the signal amplitude of the ultrasonic reflected wave 114 may decrease when the user directly touches the touch surface with a finger due to the damping effect discussed above. Accordingly, the sensor circuit 107 can evaluate the ultrasonic reflected wave 114 for touch events resulting from direct touch or indirect touch by the user.

In contrast, when the material of the coupling medium 109 is a hard elastic material (e.g., a hard gel), the touch force applied to the touch surface 104 imparts a higher added pressure on the flexible membrane 118 than if a softer elastic material were used. In other words, the coupling medium 109 distributes all of the touch force to the flexible membrane 118 as if the touch surface 104 is rigidly connected to the flexible membrane 118. As result, the touch force results in an abrupt reduction in the MEMS cavity height (e.g., the flexible membrane 118 bottoms out) and the transceiver transducer 115 becomes insensitive to all ultrasound reflections or echoes measured during the touch event. In other words, the signal amplitudes of all ultrasound reflections, including the ultrasonic reflected waves 113 and 114, are abruptly and drastically decreased to, for example, a minimum signal level where the minimum signal level corresponds to a case when a gap between the flexible membrane 118 and the counter electrode 119 is at a minimum (e.g., less than a gap threshold), which may occur when the flexible membrane 118 and the counter electrode 119 are in contact and there is no gap or when the flexible membrane 118 has reached its maximum deflection position and is held at that maximum deflection position by the internal force. In either case, the flexible membrane 118 is unable to respond (e.g., vibrate) to the ultrasonic reflected waves 113 and 114.

A signal change that is abrupt may be detected by sensor circuit 107 by analyzing the rate of change of the signal change, where the rate of change exceeds a threshold. A signal change that is gradual may be detected by the sensor circuit 107 by analyzing the rate of change of the signal change, where the rate of change does not exceed the threshold.

As a result, the sensor circuit 107 can measure a change (e.g., a signal decrease) in the signal amplitude of the ultrasonic reflected wave 113, the signal amplitude of the ultrasonic reflected wave 114, or both the ultrasonic reflected waves 113 and 114 and evaluate the change. For example, in a case that the sensor circuit 107 determines that the signal amplitude of the ultrasonic reflected wave 113 decreases from the baseline level of the ultrasonic reflected wave 113 by an amount that satisfies a threshold, the sensor circuit 107 can determine that the touch event has occurred.

Alternatively, the sensor circuit 107 can measure a change (e.g., a signal decrease) in the signal amplitude of all ultrasound reflections or a subset of the ultrasound reflections (e.g., ultrasonic reflected waves 113 and 114) relative to a respective baseline level for each ultrasound reflection. If the sensor circuit 107 determines that all of the ultrasound reflections or all of the ultrasound reflections in the subset of the ultrasound reflections undergo a signal decrease relative to the respective baseline level, the sensor circuit 107 can determine that the touch event has occurred. The sensor circuit 107 may compare an amount of signal decrease for each of the ultrasound reflections to a respective threshold and determine that the touch event is present if each amount of signal decrease satisfies the respective threshold.

Alternatively, since the transceiver transducer 115 becomes insensitive to all ultrasound reflections in the presence of the touch event, the sensor circuit 107 can detect the touch event if the signal amplitudes of all ultrasound reflections or the subset of the ultrasound reflections (e.g., ultrasonic reflected waves 113 and 114) measured by the transceiver transducer 115 are equal, for example, to the minimum signal level. This phenomenon occurs when the transceiver transducer 115 has become insensitive to all ultrasound reflections.

It will be appreciated that the touch detection algorithm used by the sensor circuit 107 can be configured with the pressure sensing system best suited to the material of the coupling medium 109 used in the ultrasonic touch sensor 100B.

As indicated above, FIG. 1B is provided merely as an example. Other examples are possible and may differ from what was described with regard to FIG. 1B. For example, in some implementations, an array or transmitters, receivers, or transceivers may be provided within the interior volume 103 of the ultrasonic touch sensor 100B. In some implementations, the touch structure 102 may include multiple layers resulting in more than two ultrasound reflections or echoes. In some implementations, additional circuit components may be added without deviating from the disclosure provided above.

Figure 1C:
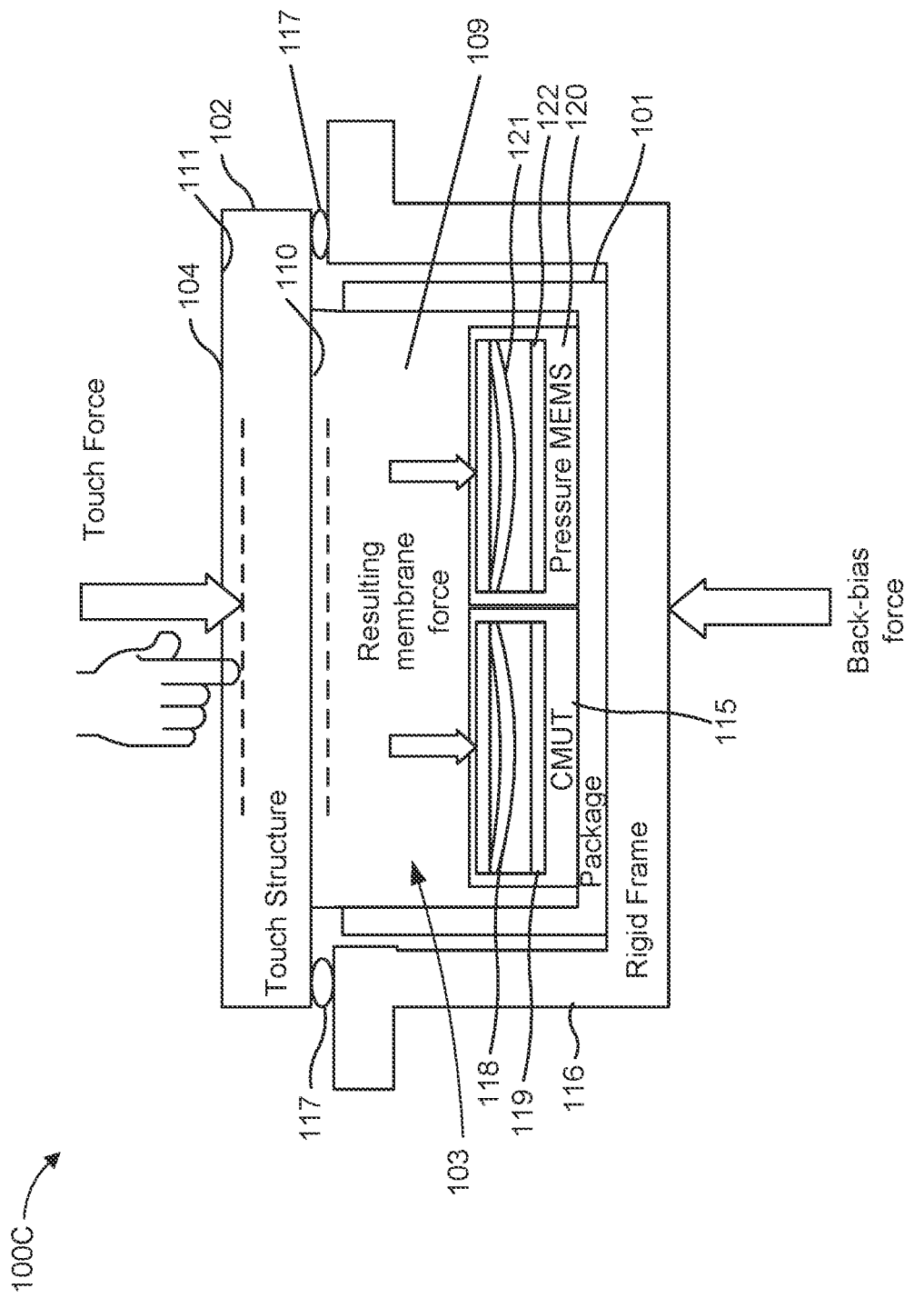
FIG. 1C illustrates an ultrasonic touch sensor according to one or more implementations.

FIG. 1C illustrates an ultrasonic touch sensor 100C according to one or more implementations. In addition to measuring reflected ultrasound waves, such as ultrasonic reflected waves 113 and 114 for touch detection, the ultrasonic touch sensor 100C can be configured to detect pressure changes resultant from a touch event for performing the touch detection. Such a configuration will enable the ultrasonic touch sensor 100C to detect touch events even when the user is wearing a glove.

The ultrasonic touch sensor 100C is similar to the ultrasonic touch sensor 100B, with the exception that a pressure sensor 120 is separately provided inside the interior volume 103. Additionally, the sensor circuit 107 is present but not shown in FIG. 1C. Furthermore, while some differences between the ultrasonic touch sensor 100A and the ultrasonic touch sensor 100C may exist, it will be appreciated that pressure sensing system described in conjunction the ultrasonic touch sensor 100C of FIG. 1C can be similarly applied to the ultrasonic touch sensor 100A of FIG. 1A.

The pressure sensor 120 may be a MEMS capacitive pressure sensor that measures an external force (e.g., a mechanical pressure or an acoustic wave) applied thereto by measuring a change in a variable capacitance. The pressure sensor 120 has two electrodes that form a capacitor having the variable capacitance. One of those two electrodes is a flexible membrane 121 with a conductive layer and the other of the two electrodes is a counter electrode 122. The flexible membrane 121 is a movable structure that moves (e.g., deflects) when the external force is applied thereto, thereby changing a distance or a gap between the flexible membrane 121 and the counter electrode 122. A change in the distance or the gap between the flexible membrane 121 and the counter electrode 122 causes a change in the variable capacitance that can be measured by the sensor circuit 107. For example, capacitance is calculated according to a formula, such as $Q=CV$, where Q is a charge in coulombs, C is the capacitance in farads, and V is a potential difference between the two electrodes of the capacitor in volts. The sensor circuit 107 may be used to measure the change in the capacitance by, for example, reading out the potential difference as a voltage signal while the charge Q is held constant. Thus, a voltage of the voltage signal is the variable to be measured by the sensor circuit 107.

When the user touches the touch structure 102, the touch structure 102 is pushed or bent inward by the touch force as a mechanical effect, which causes the touch force to be mechanically coupled into the coupling medium 109. In particular, the touch force causes internal pressure inside the coupling medium 109. Because the coupling medium 109 is coupled to (e.g., in contact with) both the touch structure 102 and to the flexible membrane 121 of the pressure sensor 120, the internal pressure acts as a mechanical force on the flexible membrane 121. In other words, the touch force is translated by the coupling medium 109 into a pressure that is applied to the flexible membrane 121. When the touch force is removed, the internal pressure acting on the flexible membrane 121 is also removed. Thus, the internal pressure induced by a mechanical coupling of the coupling medium 109 can be detected directly at the pressure sensor 120 by evaluating the voltage of the voltage signal output by the pressure sensor 120. This pressure sensing system can be used for detecting any type of touch applied to the touch surface 104, even those involving indirect contact with a finger, such as when a glove is involved.

As a result, the pressure sensor 120 is configured to convert the internal pressure into a pressure sensor signal. The pressure sensor signal is a measure of the capacitance of the pressure sensor 120 that changes based on a change in the internal pressure acting on the pressure sensor 120 (e.g., on the flexible membrane 121).

The sensor circuit 107 may be configured to detect a change in pressure acting on the flexible membrane 121 independent from analyzing the ultrasonic reflected waves 113 and 114 or in conjunction with analyzing the ultrasonic reflected waves 113 and 114. An advantage of using the transceiver transducer 115 for touch detection is that ultrasonic sensing realized by the transceiver transducer 115 is insensitive to water droplets, whereas the pressure sensor 120 is sensitive to any type of external force applied to the touch surface 104, including water droplets.

In some implementations, the transceiver transducer 115 may be used as a MEMS capacitive pressure sensor similar to that of pressure sensor 120. This is because, like the pressure sensor 120, the transceiver transducer 115 has two electrodes (e.g., the flexible membrane 118 and the counter electrode 119) that can be used to form a capacitor. As a result, the transceiver transducer 115 can be configured into two different operating modes for touch sensing, with a first mode being an ultrasonic sensing mode during which ultrasound waves are generated and ultrasound reflections are analyzed and a second mode being a pressure sensing mode during which the internal pressure imparted onto the coupling medium 109 by the external force is measured in a manner similarly described with respect to pressure sensor 120.

During the pressure sensing mode, the sensor circuit 107 may be configured to disable the transceiver transducer 115 or the transmitter 105 such that ultrasound waves are not transmitted. By doing so, the transceiver transducer 115 or the receiver 106 is configured to convert the internal pressure into a pressure sensor signal. The pressure sensor signal is a measure of a capacitance of the transceiver transducer 115 or the receiver 106 that changes based on a change in the internal pressure acting on the transceiver transducer 115 or the receiver 106. In this way, the transceiver transducer 115 or the receiver 106 is configured as a capacitive pressure sensor and the pressure sensor signal is a direct measure of the internal pressure.

The sensor circuit 107 may include a controller that is configured to switch the operating modes of the transceiver transducer 115 between the ultrasonic sensing mode and the pressure sensing mode in order to take advantage of the benefits of both touch sensing principles in the same touch sensor. For example, the ultrasonic sensing mode enables touch detection through metal touch surfaces and provides water droplet immunity, whereas the pressure sensing mode enables touch detection for indirect touch applications (e.g., when a user is wearing a glove). Combining both touch sensing principles with sensor fusion provides an efficient way to increase robustness of the touch detection. Moreover, a capacitive MEMS of the CMUT can have the same structure and technology layer stack as a capacitive pressure sensor, which enables deployment of the two sensing principles in a single touch sensor.

As indicated above, FIG. 1C is provided merely as an example. Other examples are possible and may differ from what was described with regard to FIG. 1C. For example, in some implementations, an array or transmitters, receivers, or transceivers may be provided within the interior volume 103 of the ultrasonic touch sensor 100C. In some implementations, the touch structure 102 may include multiple layers resulting in more than two ultrasound reflections or echoes. In some implementations, additional circuit components may be added without deviating from the disclosure provided above.

Figure 2:
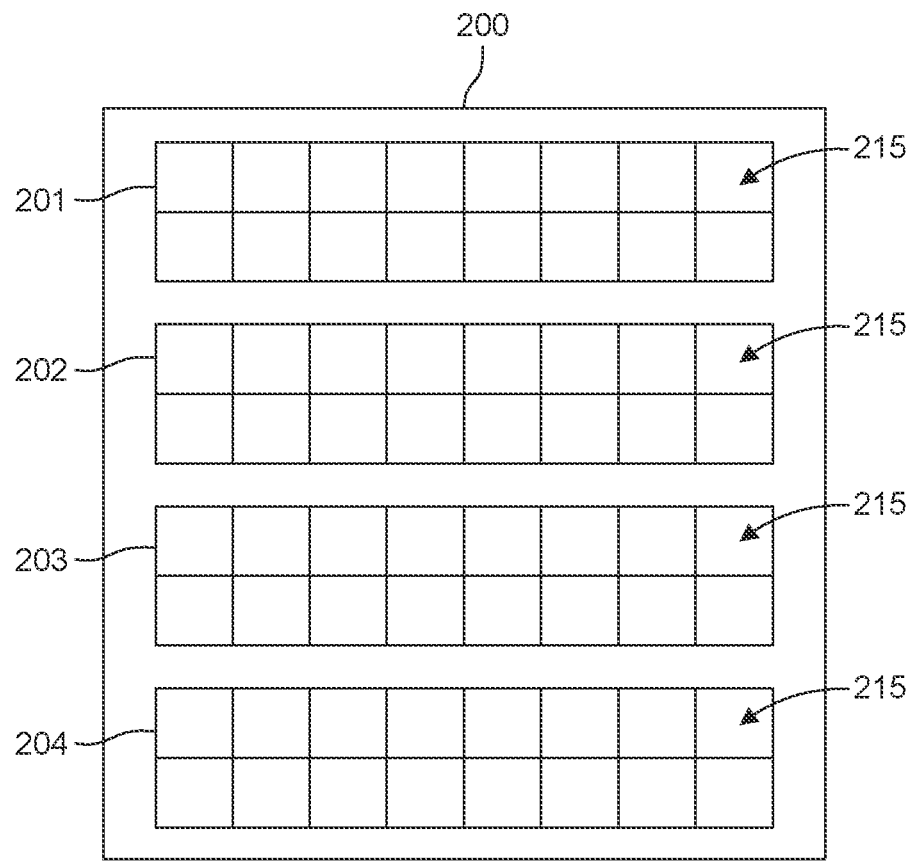
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the interior volume 103 to cover a substantial area under the touch structure 102. The array of transceiver transducers 200 may include two or more sub-arrays 201-204 that each includes a subset of transceiver transducers 215. Individual transceiver transducers 215 of the array of transceiver transducers 200 are configurable as transmitters, receivers, or transceivers. Additionally, the individual transceiver transducers 215 of the array of transceiver transducers 200 may be individually configured into the ultrasonic sensing mode or the pressure sensing mode. As a result, all of the transceiver transducers 215 may be simultaneously configured into the ultrasonic sensing mode, all of the transceiver transducers 215 may be simultaneously configured into the pressure sensing mode, or a first subset of the transceiver transducers 215 may be configured into the ultrasonic sensing mode while a second subset of the transceiver transducers 215 may be configured into the pressure sensing mode to provide a dynamic configuration that utilized both touch sensing principles.

This configurability may be set on an individual basis (transducer-by-transducer), on a sub-array basis, or some other basis. Moreover, while each of the transceiver transducers 215 is shown to be substantially equal in size, the transceiver transducers 215 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 215 of the array of transceiver transducers 200 is separately controllable by the sensor circuit 107. They may be individually excited, alone or in combination, as transmitters and may be individually configured, alone or in combination, for receiving ultrasound waves. Additionally, the transceiver transducers 215 may be individually configured into pressure sensing mode. When one or more transceiver transducers 215 are excited, each transceiver transducer 215 produces its own ultrasonic transmit wave with acoustic aperture or beam width (e.g., proportional to the size of the membrane). If two or more transceiver transducers 215 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array of transceiver transducers 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 215 is excited or multiple transceiver transducers 215 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 215 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more receive transducers and determine whether the no-touch event or the touch event has occurred at the touch surface 104 based on at least one measurement signal received from the array of transceiver transducers 200. The receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 215 or the operating modes of the transceiver transducers 215.

As indicated above, FIG. 2 is provided merely as an example. Other examples are possible and may differ from what was described with regard to FIG. 2. In some implementations, additional circuit components may be added without deviating from the disclosure provided above.

Figure 3:
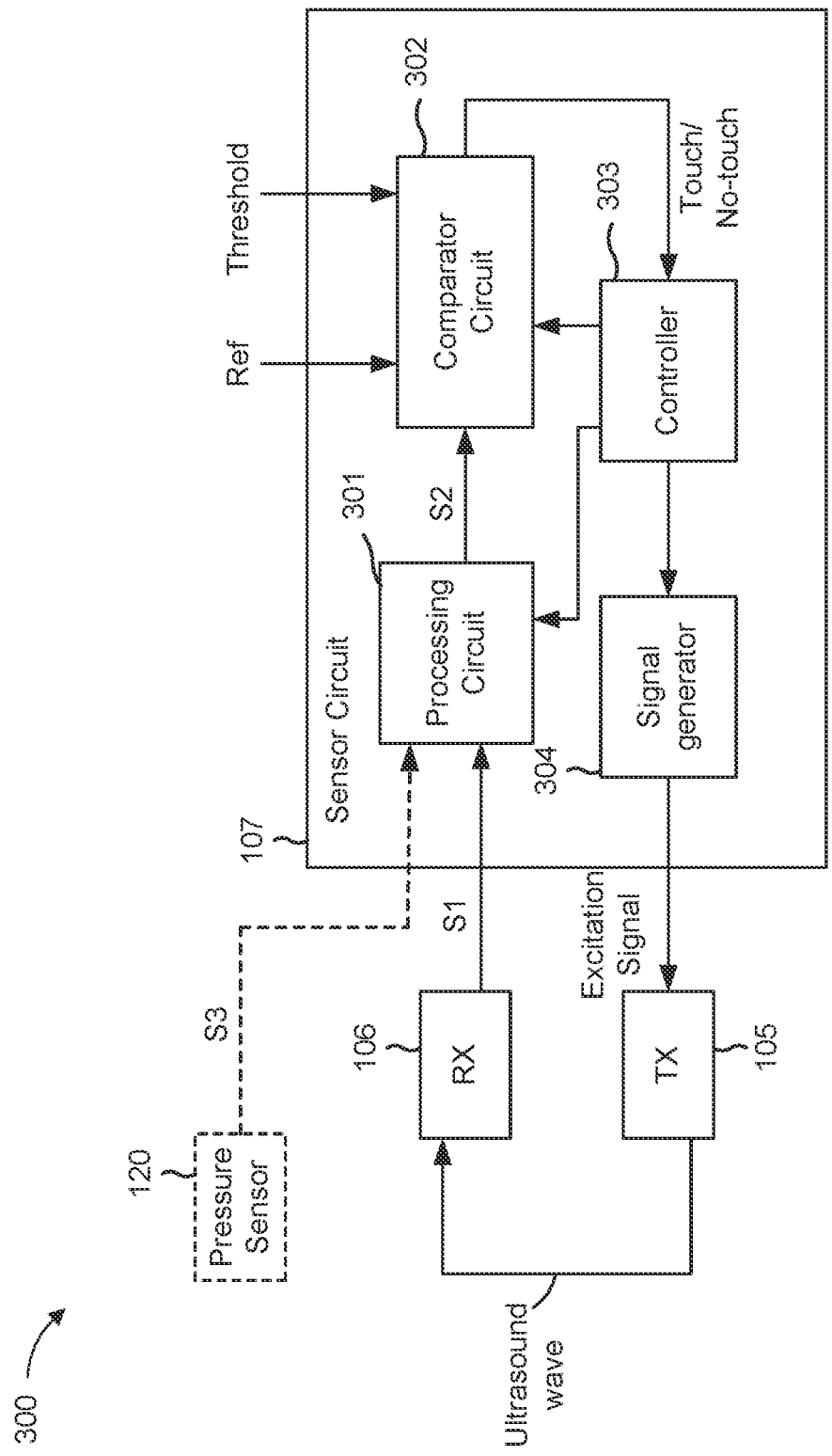
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105. In some implementations, the transmitter 105 and the receiver 106 may be implemented as a transceiver (e.g., the transceiver transducer 115).

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104. The sensor circuit 107 may be configurable into an ultrasonic sensing mode and a pressure sensing mode. While configured in the pressure sensing mode, the sensor circuit 107 may be configured to exploit a change in sensitivity induced by an internal pressure acting on a flexible membrane of the receiver 106 to detect an external force applied to the touch surface 104, including the touch force of the touch event. For example, the sensor circuit 107 may be configured to detect a change in the internal pressure acting on the flexible membrane when analyzing the ultrasonic reflected waves 113 and 114 as described above in connection with FIGS. 1A-1C.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave (e.g., ultrasonic reflected wave 114), which may be evaluated during a corresponding observation window.

The processing circuit 301 is configured to process the measurement signal S1 in order to determine a feature of the measurement signal S1 and generate a measured value S2 based on the feature of the measurement signal S1. In some implementations, the processing circuit 301 may include a processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

In some implementations, the processing circuit 301 may be configured to generate the measured value S2 in a first observation window corresponding to the ultrasonic reflected wave 113 for evaluating the signal amplitude of the ultrasonic reflected wave 113, and/or generate the measured value S2 in a second observation window corresponding to the ultrasonic reflected wave 114 for evaluating the signal amplitude of the ultrasonic reflected wave 114.

The processor may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 301 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 301 (e.g., the processor) may be configured to calculate a distance of the measurement signal S1 relative to the reference signal during the corresponding observation window to generate the measured value S2. For example, the processing circuit 301 may calculate a Euclidean distance between the measurement signal S1 and the reference signal as the measured value S2, a squared Euclidian distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 302 may be configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 302 may compare the measured value S2 to the threshold, detect the no-touch event when the measured value S2 does not satisfy the threshold (e.g., the measured value S2 is equal to or less than the threshold, the measured value S2 is less than the threshold, or the measured value S2 does not satisfy another condition relative to the threshold), and detect the touch event when the measured value S2 satisfies the threshold (e.g., the measured value S2 is equal to or greater than the threshold, the measured value S2 is greater than the threshold, or the measured value S2 satisfies another condition relative to the threshold).

For example, when the material of the coupling medium 109 is a medium-hard elastic material, the comparator circuit 302 may be configured to compare the measured value S2 corresponding to the ultrasonic reflected wave 113 with a threshold and detect that the touch event has occurred when the measured value S2 corresponding to the ultrasonic reflected wave 113 satisfies the threshold. In some implementations, the comparator circuit 302 may indicate that the touch event has occurred when a signal amplitude of the ultrasonic reflected wave 113 indicated by the measured value S2 increases from a baseline level by more than a threshold.

Similarly, when the material of the coupling medium 109 is a medium-hard elastic material, the comparator circuit 302 may be configured to compare the measured value S2 corresponding to the ultrasonic reflected wave 114 with a threshold and detect that the touch event has occurred when the measured value S2 corresponding to the ultrasonic reflected wave 114 satisfies the threshold. In some implementations, the comparator circuit 302 may indicate that the touch event has occurred when a signal amplitude of the ultrasonic reflected wave 114 indicated by the measured value S2 increases from a baseline level by more than the threshold.

Alternatively, or additionally, if the comparator circuit 302 determines that all of the ultrasound reflections undergo a signal increase relative to the respective baseline level, the comparator circuit 302 may determine that the touch event has occurred. The signal increases of the measured ultrasound reflections may be the same or may be proportional to each other.

In some implementations, the comparator circuit 302 may detect the no-touch event when a difference between the measured value S2 and a reference value Ref (e.g., the baseline level) does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 302 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 may be configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

Alternatively, when the material of the coupling medium 109 is a hard elastic material (e.g., a hard gel), the comparator circuit 302 may be configured to evaluate a rate of change of a signal change of the measured value S2 relative to a threshold. For example, in some implementations, the comparator circuit 302 may be configured to indicate that the touch event has occurred when a signal amplitude of the ultrasonic reflected wave 113 indicated by the measured value S2 decreases from a baseline level by more than a threshold. Alternatively, in some implementations, the comparator circuit 302 may be configured to indicate that the touch event has occurred when the signal amplitudes of all ultrasound reflections or a subset of the ultrasound reflections (e.g., ultrasonic reflected waves 113 and 114) undergo a signal decrease relative to a respective baseline level. The comparator circuit 302 may compare an amount of signal decrease for each of the ultrasound reflections to a respective threshold and determine that the touch event is present if each amount of signal decrease satisfies the respective threshold. Alternatively, in some implementations, since the receiver 106 becomes insensitive to all ultrasound reflections in the presence of the touch event, the comparator circuit 302 can detect the touch event if the signal amplitudes of all ultrasound reflections or the subset of the ultrasound reflections (e.g., ultrasonic reflected waves 113 and 114) measured by the receiver 106 are equal to or substantially equal to a minimum signal level. This phenomenon occurs when the receiver 106 has become insensitive to all ultrasound reflections.

In some implementations, the ultrasonic touch sensor 300 may include the pressure sensor 120 that is configured to provide a pressure sensor signal S3 (e.g., a voltage signal) to the processing circuit 301 for evaluation. In particular, the pressure sensor 120 may be configured to convert the internal pressure into the pressure sensor signal S3, wherein the pressure sensor signal is a measure of a capacitance of the capacitive pressure sensor that changes based on a change in the internal pressure acting on the pressure sensor 120. The processing circuit 301 may be configured to detect a change in pressure acting on the flexible membrane 121 independently from analyzing the ultrasonic reflected waves 113 and 114 or in conjunction with analyzing the ultrasonic reflected waves 113 and 114.

In some implementations, the receiver 106 may be used as a capacitive pressure sensor in a manner similar to a use of the pressure sensor 120, as described above in connection with FIG. 1C. As a result, the receiver 106 can be configured into two different operating modes for touch sensing, with a first mode being an ultrasonic sensing mode during which ultrasound waves are generated and ultrasound reflections are analyzed, and a second mode being a pressure sensing mode during which the internal pressure imparted onto the coupling medium 109 by the external force is measured in a manner similar to that described with respect to pressure sensor 120.

As indicated above, FIG. 3 is provided merely as an example. Other examples are possible and may differ from what was described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would enable the ultrasonic touch sensor 300 flexibility to accommodate different types of touch structures, different types of touch gestures, and/or different types of touch environments.

The following provides an overview of some Aspects of the present disclosure:

Aspect 1: A touch sensor, comprising: a frame that defines an ultrasound chamber; a touch structure coupled to the frame and arranged over the ultrasound chamber such that the ultrasound chamber forms an enclosed interior volume, wherein the touch structure comprises a touch interface and an inner interface arranged opposite to the touch interface, wherein the inner interface faces towards the enclosed interior volume; a capacitive ultrasonic transmitter arranged inside the enclosed interior volume, wherein the capacitive ultrasonic transmitter is configured to transmit an ultrasonic transmit wave towards the touch structure; a capacitive ultrasonic receiver arranged inside the enclosed interior volume and coupled to the capacitive ultrasonic transmitter via a propagation path, wherein the capacitive ultrasonic receiver is configured to receive a first ultrasonic reflected wave produced from the ultrasonic transmit wave being internally reflected at the inner interface and receive a second ultrasonic reflected wave produced from the ultrasonic transmit wave being internally reflected at the touch interface; a coupling medium that fills an area between the inner interface and the capacitive ultrasonic receiver to form part of the propagation path, wherein the inner interface and the capacitive ultrasonic receiver are mechanically coupled to each other by the coupling medium, wherein an external force applied to the touch interface is configured to impart an internal pressure onto the capacitive ultrasonic receiver through the coupling medium, wherein the internal pressure is proportional to the external force; and a sensor circuit configured to convert the first ultrasonic reflected wave received by the capacitive ultrasonic receiver into a first measurement signal, convert the second ultrasonic reflected wave received by the capacitive ultrasonic receiver into a second measurement signal, and detect the external force based on at least one of the first measurement signal or the second measurement signal.

Aspect 2: The touch sensor of Aspect 1, further comprising: at least one elastic coupling structure that elastically attaches the touch structure to the frame, wherein the at least one elastic coupling structure enables the touch structure to translate the external force onto the coupling medium to impart the internal pressure onto the capacitive ultrasonic receiver.

Aspect 3: The touch sensor of any of Aspects 1-2, wherein the sensor circuit is configured to detect the external force on a condition that the sensor circuit detects an increase in a signal amplitude of the first measurement signal.

Aspect 4: The touch sensor of any of Aspects 1-3, wherein the sensor circuit is configured to detect the external force on a condition that a signal amplitude of the first measurement signal is greater than a reference level, wherein the reference level corresponds to a case when no external force is applied to the touch interface.

Aspect 5: The touch sensor of Aspect 4, wherein the sensor circuit is configured to detect the external force and detect that a touch event has occurred at the touch interface on a condition that the signal amplitude of the first measurement signal is greater than the reference level by a threshold amount.

Aspect 6: The touch sensor of any of Aspects 1-5, wherein the sensor circuit is configured to detect that a touch event has occurred at the touch interface on a condition that a signal amplitude of the first measurement signal is greater than a reference level, wherein the reference level corresponds to a case when no external force is applied to the touch interface.

Aspect 7: The touch sensor of any of Aspects 1-6, wherein the sensor circuit is configured to detect that a touch event has occurred at the touch interface on a condition that a signal amplitude of the second measurement signal is greater than a reference level, wherein the reference level corresponds to a case when no external force is applied to the touch interface.

Aspect 8: The touch sensor of any of Aspects 1-7, wherein the sensor circuit is configured to detect that a touch event has occurred at the touch interface on a condition that a first signal amplitude of the first measurement signal is greater than a first reference level and a second signal amplitude of the second measurement signal is greater than a second reference level, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

Aspect 9: The touch sensor of any of Aspects 1-8, wherein the sensor circuit is configured to detect that a touch event has occurred at the touch interface on a condition that a first signal amplitude of the first measurement signal is greater than a first reference level by a first threshold amount and a second signal amplitude of the second measurement signal is greater than a second reference level by a second threshold amount, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

Aspect 10: The touch sensor of any of Aspects 1-9, wherein the sensor circuit is configured to detect the external force on a condition that the sensor circuit detects a decrease in a signal amplitude of the first measurement signal.

Aspect 11: The touch sensor of any of Aspects 1-10, wherein the sensor circuit is configured to detect the external force on a condition that a signal amplitude of the first measurement signal is less than a reference level, wherein the reference level corresponds to a case when no external force is applied to the touch interface.

Aspect 12: The touch sensor of Aspect 11, wherein the sensor circuit is configured to detect the external force and detect that a touch event has occurred at the touch interface on a condition that the signal amplitude of the first measurement signal is less than the reference level by a threshold amount.

Aspect 13: The touch sensor of any of Aspects 1-12, wherein the sensor circuit is configured to detect that a touch event has occurred at the touch interface on a condition that a signal amplitude of the first measurement signal is less than a reference level by a threshold amount, wherein the reference level corresponds to a case when no external force is applied to the touch interface.

Aspect 14: The touch sensor of any of Aspects 1-13, wherein the capacitive ultrasonic receiver includes a flexible membrane configured as a first electrode of a capacitor and includes a counter electrode of the capacitor, and wherein the sensor circuit is configured to detect that a touch event has occurred at the touch interface on a condition that a signal amplitude of the first measurement signal is equal to a minimum signal level, wherein the minimum signal level corresponds to a case when a gap between the flexible membrane and the counter electrode is less than a gap threshold.

Aspect 15: The touch sensor of any of Aspects 1-14, wherein the sensor circuit is configured to detect that a touch event has occurred at the touch interface on a condition that a signal amplitude of the second measurement signal is less than a reference level by a threshold amount, wherein the reference level corresponds to a case when no external force is applied to the touch interface.

Aspect 16: The touch sensor of any of Aspects 1-15, wherein the capacitive ultrasonic receiver includes a flexible membrane configured as a first electrode of a capacitor and includes a counter electrode of the capacitor, and wherein the sensor circuit is configured to detect that a touch event has occurred at the touch interface on a condition that a signal amplitude of the second measurement signal is equal to a minimum signal level, wherein the minimum signal level corresponds to a case when a gap between the flexible membrane and the counter electrode is less than a gap threshold.

Aspect 17: The touch sensor of any of Aspects 1-16, wherein the sensor circuit is configured to detect that a touch event has occurred at the touch interface on a condition that a first signal amplitude of the first measurement signal is less than a first reference level by a first threshold amount and a second signal amplitude of the second measurement signal is less than a second reference level by a second threshold amount, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

Aspect 18: The touch sensor of any of Aspects 1-17, wherein the capacitive ultrasonic receiver includes a flexible membrane configured as a first electrode of a capacitor and includes a counter electrode of the capacitor, wherein the sensor circuit is configured to detect that a touch event has occurred at the touch interface on a condition that a first signal amplitude of the first measurement signal is equal to a minimum signal level and a second signal amplitude of the second measurement signal is equal to the minimum signal level, and wherein the minimum signal level corresponds to a case when a gap between the flexible membrane and the counter electrode is less than a gap threshold.

Aspect 19: The touch sensor of any of Aspects 1-18, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, wherein, in the pressure sensing mode, the sensor circuit is configured to determine that the touch event has occurred at the touch interface based on detecting an increase in a signal amplitude of the first measurement signal or detecting an increase in a signal amplitude of the second measurement signal.

Aspect 20: The touch sensor of any of Aspects 1-19, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, wherein, in the pressure sensing mode, the sensor circuit is configured to determine that the touch event has occurred at the touch interface based on detecting an increase in a signal amplitude of the first measurement signal and detecting an increase in a signal amplitude of the second measurement signal.

Aspect 21: The touch sensor of any of Aspects 1-20, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a gradual decrease in a signal amplitude of the second measurement signal, wherein, in the pressure sensing mode, the sensor circuit is configured to determine that the touch event has occurred at the touch interface based on detecting an abrupt decrease in a signal amplitude of the first measurement signal and in a signal amplitude of the second measurement signal.

Aspect 22: The touch sensor of any of Aspects 1-21, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a gradual decrease in a signal amplitude of the second measurement signal, wherein, in the pressure sensing mode, the sensor circuit is configured to determine that the touch event has occurred at the touch interface based on detecting that a signal amplitude of the first measurement signal and a signal amplitude of the second measurement signal equal a minimum signal level.

Aspect 23: The touch sensor of any of Aspects 1-22, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, wherein, in the pressure sensing mode, the sensor circuit is configured to determine that the touch event has occurred at the touch interface based on detecting an increase in a signal amplitude of the first measurement signal and detecting an increase in a signal amplitude of the second measurement signal.

Aspect 24: The touch sensor of any of Aspects 1-23, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, wherein, in the pressure sensing mode, the sensor circuit is configured to disable the capacitive ultrasonic transmitter such that capacitive ultrasonic receiver is configured to convert the internal pressure into a pressure sensor signal, wherein the pressure sensor signal is a measure of a capacitance of the capacitive ultrasonic receiver that changes based on a change in the internal pressure acting on the capacitive ultrasonic receiver.

Aspect 25: The touch sensor of Aspect 24, wherein the pressure sensor signal is a direct measure of the internal pressure.

Aspect 26: The touch sensor of any of Aspects 1-25, further comprising: a capacitive pressure sensor arranged inside the enclosed interior volume, wherein the coupling medium fills an area between the inner interface and the capacitive pressure sensor, wherein the inner interface and the capacitive pressure sensor are mechanically coupled to each other by the coupling medium, wherein the external force applied to the touch interface is configured to impart the internal pressure onto the capacitive pressure sensor through the coupling medium, and wherein the capacitive pressure sensor is configured to convert the internal pressure into a pressure sensor signal, wherein the pressure sensor signal is a measure of a capacitance of the capacitive pressure sensor that changes based on a change in the internal pressure acting on the capacitive pressure sensor.

Aspect 27: The touch sensor of any of Aspects 1-26, further comprising: a capacitive ultrasonic transceiver comprising the capacitive ultrasonic transmitter and the capacitive ultrasonic receiver.

Aspect 28: The touch sensor of any of Aspects 1-27, wherein the first measurement signal and the second measurement signal are different portions of a continuous measurement signal output by the capacitive ultrasonic receiver.

Aspect 29: A system configured to perform one or more operations recited in one or more of Aspects 1-28.

Aspect 30: An apparatus comprising means for performing one or more operations recited in one or more of Aspects 1-28.

Aspect 31: A non-transitory computer-readable medium storing a set of instructions, the set of instructions comprising one or more instructions that, when executed by a device, cause the device to perform one or more operations recited in one or more of Aspects 1-28.

Aspect 32: A computer program product comprising instructions or code for executing one or more operations recited in one or more of Aspects 1-28.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium, such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A touch sensor, comprising:
  a frame that defines an ultrasound chamber;
  a touch structure coupled to the frame and arranged over the ultrasound chamber such that the ultrasound chamber forms an enclosed interior volume, wherein the touch structure comprises a touch interface and an inner interface arranged opposite to the touch interface, wherein the inner interface faces towards the enclosed interior volume;
  a capacitive ultrasonic transmitter arranged inside the enclosed interior volume, wherein the capacitive ultrasonic transmitter is configured to transmit an ultrasonic transmit wave towards the touch structure;
  a capacitive ultrasonic receiver arranged inside the enclosed interior volume and coupled to the capacitive ultrasonic transmitter via a propagation path, wherein the capacitive ultrasonic receiver is configured to receive a first ultrasonic reflected wave produced from the ultrasonic transmit wave being internally reflected at the inner interface and receive a second ultrasonic reflected wave produced from the ultrasonic transmit wave being internally reflected at the touch interface;
  a coupling medium that fills an area between the inner interface and the capacitive ultrasonic receiver to form part of the propagation path, wherein the inner interface and the capacitive ultrasonic receiver are mechanically coupled to each other by the coupling medium, wherein an external force applied to the touch interface is configured to impart an internal pressure onto the capacitive ultrasonic receiver through the coupling medium, wherein the internal pressure is proportional to the external force; and
  a sensor circuit configured to convert the first ultrasonic reflected wave received by the capacitive ultrasonic receiver into a first measurement signal, convert the second ultrasonic reflected wave received by the capacitive ultrasonic receiver into a second measurement signal, and detect the external force based on at least one of the first measurement signal or the second measurement signal.

2. The touch sensor of claim 1, further comprising:
  at least one elastic coupling structure that elastically attaches the touch structure to the frame, wherein the at least one elastic coupling structure enables the touch structure to translate the external force onto the coupling medium to impart the internal pressure onto the capacitive ultrasonic receiver.

3. The touch sensor of claim 1, wherein the sensor circuit is configured to detect the external force on a condition that the sensor circuit detects an increase in a signal amplitude of the first measurement signal.

4. The touch sensor of claim 1, wherein the sensor circuit is configured to detect that a touch event has occurred at the touch interface on a condition that a signal amplitude of the first measurement signal is greater than a reference level, wherein the reference level corresponds to a case when no external force is applied to the touch interface.

5. The touch sensor of claim 1, wherein the sensor circuit is configured to detect that a touch event has occurred at the touch interface on a condition that a signal amplitude of the second measurement signal is greater than a reference level, wherein the reference level corresponds to a case when no external force is applied to the touch interface.

6. The touch sensor of claim 1, wherein the sensor circuit is configured to detect that a touch event has occurred at the touch interface on a condition that a first signal amplitude of the first measurement signal is greater than a first reference level and a second signal amplitude of the second measurement signal is greater than a second reference level, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

7. The touch sensor of claim 1, wherein the sensor circuit is configured to detect that a touch event has occurred at the touch interface on a condition that a first signal amplitude of the first measurement signal is greater than a first reference level by a first threshold amount and a second signal amplitude of the second measurement signal is greater than a second reference level by a second threshold amount, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

8. The touch sensor of claim 1, wherein the sensor circuit is configured to detect the external force on a condition that the sensor circuit detects a decrease in a signal amplitude of the first measurement signal.

9. The touch sensor of claim 1, wherein the sensor circuit is configured to detect that a touch event has occurred at the touch interface on a condition that a signal amplitude of the first measurement signal is less than a reference level by a threshold amount, wherein the reference level corresponds to a case when no external force is applied to the touch interface.

10. The touch sensor of claim 1, wherein the capacitive ultrasonic receiver includes a flexible membrane configured as a first electrode of a capacitor and includes a counter electrode of the capacitor, and wherein the sensor circuit is configured to detect that a touch event has occurred at the touch interface on a condition that a signal amplitude of the first measurement signal is equal to a minimum signal level, wherein the minimum signal level corresponds to a case when a gap between the flexible membrane and the counter electrode is less than a gap threshold.

11. The touch sensor of claim 1, wherein the sensor circuit is configured to detect that a touch event has occurred at the touch interface on a condition that a signal amplitude of the second measurement signal is less than a reference level by a threshold amount, wherein the reference level corresponds to a case when no external force is applied to the touch interface.

12. The touch sensor of claim 1, wherein the capacitive ultrasonic receiver includes a flexible membrane configured as a first electrode of a capacitor and includes a counter electrode of the capacitor, and wherein the sensor circuit is configured to detect that a touch event has occurred at the touch interface on a condition that a signal amplitude of the second measurement signal is equal to a minimum signal level, wherein the minimum signal level corresponds to a case when a gap between the flexible membrane and the counter electrode is less than a gap threshold.

13. The touch sensor of claim 1, wherein the sensor circuit is configured to detect that a touch event has occurred at the touch interface on a condition that a first signal amplitude of the first measurement signal is less than a first reference level by a first threshold amount and a second signal amplitude of the second measurement signal is less than a second reference level by a second threshold amount, wherein the first reference level corresponds to a case when the first ultrasonic reflected wave is received when no external force is applied to the touch interface, and wherein the second reference level corresponds to a case when the second ultrasonic reflected wave is received when no external force is applied to the touch interface.

14. The touch sensor of claim 1, wherein the capacitive ultrasonic receiver includes a flexible membrane configured as a first electrode of a capacitor and includes a counter electrode of the capacitor, wherein the sensor circuit is configured to detect that a touch event has occurred at the touch interface on a condition that a first signal amplitude of the first measurement signal is equal to a minimum signal level and a second signal amplitude of the second measurement signal is equal to the minimum signal level, and wherein the minimum signal level corresponds to a case when a gap between the flexible membrane and the counter electrode is less than a gap threshold.

15. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, and wherein, in the pressure sensing mode, the sensor circuit is configured to determine that the touch event has occurred at the touch interface based on detecting an increase in a signal amplitude of the first measurement signal or detecting an increase in a signal amplitude of the second measurement signal.

16. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, and wherein, in the pressure sensing mode, the sensor circuit is configured to determine that the touch event has occurred at the touch interface based on detecting an increase in a signal amplitude of the first measurement signal and detecting an increase in a signal amplitude of the second measurement signal.

17. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a gradual decrease in a signal amplitude of the second measurement signal, and wherein, in the pressure sensing mode, the sensor circuit is configured to determine that the touch event has occurred at the touch interface based on detecting an abrupt decrease in a signal amplitude of the first measurement signal and in a signal amplitude of the second measurement signal.

18. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a gradual decrease in a signal amplitude of the second measurement signal, and wherein, in the pressure sensing mode, the sensor circuit is configured to determine that the touch event has occurred at the touch interface based on detecting that a signal amplitude of the first measurement signal and a signal amplitude of the second measurement signal equal a minimum signal level.

19. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal from a baseline level by more than a threshold, and wherein, in the pressure sensing mode, the sensor circuit is configured to determine that the touch event has occurred at the touch interface based on detecting an increase in a signal amplitude of the first measurement signal, and detecting an increase in a signal amplitude of the second measurement signal, from the baseline level by more than the threshold.

20. The touch sensor of claim 1, wherein the sensor circuit is configurable into an ultrasonic sensing mode and a pressure sensing mode, wherein, in the ultrasonic sensing mode, the sensor circuit is configured to detect that a touch event has occurred at the touch interface based on detecting a decrease in a signal amplitude of the second measurement signal, wherein, in the pressure sensing mode, the sensor circuit is configured to disable the capacitive ultrasonic transmitter such that capacitive ultrasonic receiver is configured to convert the internal pressure into a pressure sensor signal, wherein the pressure sensor signal is a measure of a capacitance of the capacitive ultrasonic receiver that changes based on a change in the internal pressure acting on the capacitive ultrasonic receiver.

21. The touch sensor of claim 20, wherein the pressure sensor signal is a direct measure of the internal pressure.

22. The touch sensor of claim 1, further comprising:

a capacitive pressure sensor arranged inside the enclosed interior volume, wherein the coupling medium fills an area between the inner interface and the capacitive pressure sensor, wherein the inner interface and the capacitive pressure sensor are mechanically coupled to each other by the coupling medium, wherein the external force applied to the touch interface is configured to impart the internal pressure onto the capacitive pressure sensor through the coupling medium, and wherein the capacitive pressure sensor is configured to convert the internal pressure into a pressure sensor signal, wherein the pressure sensor signal is a measure of a capacitance of the capacitive pressure sensor that changes based on a change in the internal pressure acting on the capacitive pressure sensor.

23. The touch sensor of claim 1, further comprising:

a capacitive ultrasonic transceiver comprising the capacitive ultrasonic transmitter and the capacitive ultrasonic receiver.

24. The touch sensor of claim 1, wherein the first measurement signal and the second measurement signal are different portions of a continuous measurement signal output by the capacitive ultrasonic receiver.

* * * * *